(Model.)
C. CALLAHAN.
STOP COCK.
No. 246,456.  Patented Aug. 30, 1881.
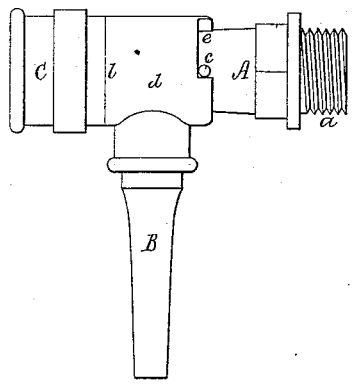
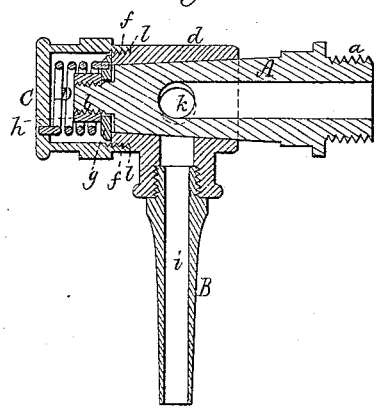
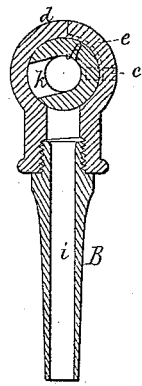
Witnesses
S. N. Piper
E. A. Pratt
Inventor
Charles Callahan
by R. H. Eddy atty.

UNITED STATES PATENT OFFICE.

CHARLES CALLAHAN, OF LOWELL, MASSACHUSETTS.

STOP-COCK.

SPECIFICATION forming part of Letters Patent No. 246,456, dated August 30, 1881.

Application filed June 27, 1881. (Model.)

*To all whom it may concern:*

Be it known that I, CHARLES CALLAHAN, of Lowell, of the county of Middlesex and State of Massachusetts, have invented a new and useful Improvement in Stop-Cocks; and I do hereby declare the same to be described in the following specification and represented in the accompanying drawings, of which—

Figure 1 is a side elevation, Fig. 2 a longitudinal section, and Fig. 3 a transverse section, of a stop-cock of my improved kind, the nature of my invention being defined by the claim hereinafter presented.

This stop-cock is one provided with means of automatically closing it, so as to intercept or shut off the flow of water or a liquid from the nozzle of such cock.

In the drawings, A denotes the tubular body of the cock, such body at one end being provided with a male screw, $a$, for connecting it with a pipe or conduit. At its opposite end the body is closed, and is there furnished with a male screw, $b$, projecting from it, as represented. Furthermore, a stud, $c$, is extended from the outer surface of the said body. A bib or nozzle, B, fitted to revolve on such body A in a plane at right angles with the axis thereof, has its tubular head $d$ notched at one end, as shown at $e$, and at the other end a screw, $f$, to receive a screw-cap, C, all being as shown. A metallic washer, $g$, arranged on the screw $b$ and against the next adjacent end of the body A, and held in place by a nut, $h$, screwed on the screw $b$, serves, with such screw and nut, to keep the nozzle B in connection with the body A.

The notch $e$ and stud $c$ limit the extent of rotary movement of the nozzle on the body, as the stud extends from the latter into the long notch of the nozzle. When the nozzle is at one terminus of its sector of revolution the discharging-openings $i$ and $k$ of the nozzle and body should lead into each other in order to allow of the flow of water from the body into and through the nozzle, the discharging-opening of the body being closed by the nozzle when when the latter is at its other extreme position.

Within the chambered screw-cap C there is is a spiral spring, D, one end of which is fastened to the washer $g$, fitted so as not to turn on the body A, and the other to the said cap, the latter, when in place on the nozzle, being screwed up to a shoulder, $l$, thereof.

The screw-cap may be constructed in one or more pieces, as convenience of attaching the spring to it and the body may require. Such spring is to be adapted or applied so as to produce the necessary rotary movement of the nozzle on the body to cut off the flow of water through them, the power generated in the spring to effect such being imparted to it mainly by turning the nozzle on the body so as to open the cock. While the nozzle may be so turned by a person and be held in position the cock will remain open; but on letting go of the nozzle the spring, by its reactive power, will turn the nozzle the opposite way, so as to cause it to close the cock.

I am aware that it is not new to provide the bib or plug of a faucet with a means of automatically closing it, such being found in the faucets described in the United States Patents Nos. 65,160 and 140,183. Therefore I do not claim such.

I claim as my invention—

The tubular body A, closed at one end and provided with the screw $b$, washer $g$, and nut $h$, as set forth, in combination with the rotary bib or nozzle B, fitted to turn on said body and provided with the screw $f$, as described, and with the spring D and chambered cap C, arranged and applied as explained, the nozzle and the body having the notch $e$, stud $c$, and the discharging-openings $i\ k$, and all being adapted and to operate essentially as hereinbefore specified.

CHAS. CALLAHAN.

Witnesses:
WM. H. ANDERSON,
SAMUEL B. WYMAN.